June 28, 1955 A. V. D. WILLGOOS 2,711,631
GAS TURBINE POWER PLANT

Filed June 21, 1949 7 Sheets-Sheet 3

Fig. 4

INVENTOR.
Andrew V. D. Willgoos, deceased.
By Hartford National Bank & Trust Co., Executor.
By Charles Warren
Attorney

United States Patent Office 2,711,631
Patented June 28, 1955

2,711,631

GAS TURBINE POWER PLANT

Andrew V. D. Willgoos, deceased, late of West Hartford, Conn., by Hartford National Bank and Trust Company, executor, Hartford, Conn., assignor to United Aircraft Corporation, East Hartford, Conn., a corporation of Connecticut Application June 21, 1949, Serial No. 100,418

20 Claims. (Cl. 60—39.37)

This invention relates to gas turbine power plants and particularly to aircraft power plants adapted for driving a propeller.

When this type of power plant has, between the compressor and the turbine, a number of combustion chambers in parallel in which fuel is burned, it is advantageous to be able to remove each chamber individually for inspection and replacement of parts without dismantling the entire power plant. If the compressor is of the centrifugal type with a radial discharge, it is not uncommon to arrange the combustion chambers for separate removal. In axial flow compressors, however, where the discharge into the burners is in an axial direction, the removal of the combustion chambers has generally necessitated the dismantling of the unit at least to the extent of separating the compressor and turbine sections axially. A feature of this invention is an arrangement of the power plant by which to inspect and to remove or replace the combustion chambers without dismantling the power plant. Another feature is the arrangement of the supporting frame of the power plant such that the combustion chambers are external thereof, making removal easy without affecting the frame. A feature is the arrangement of the power plant such that the combustion chambers are not a part of the supporting frame.

One feature of the invention is that, for the purpose of weight reduction, the power plant is designed in such a manner that the structural frame elements function primarily as essential operative elements of the power plant wherever such an arrangement is possible. In this way, the weight of elements functioning solely as a supporting frame is minimized.

This type of power plant may be supported within the airplane by a ring of engine mounts surrounding the power plant. A feature of the invention is the provision of a series of mounting brackets and accessory mounting brackets in a single part of the frame section. Another feature is the location of the fuel nozzles in the same frame section.

A feature of the invention is the spinner inlet for the compressor by which to assure a uniform distribution of air to the annular compressor inlet even when the airplane is at a high angle of attack such that the flow into the inlet is not axial.

One feature of the invention is the arrangement for cooling certain of the structural elements to prevent overheating and to maintain the structural elements at the necessary low temperature to maintain the required strength. Another feature is the arrangement of the tail pipe to provide an ejector action to encourage a flow of cooling air through the power plant.

Other objects and advantages will be apparent from the specification and claims and from the accompanying drawing which illustrates an embodiment of the invention.

The power plant is a gas turbine type of power plant adapted to drive a propeller and to provide additional thrust by the discharge of gas through a thrust nozzle. As shown, the power plant includes an axial flow compressor 10 which takes air through an inlet 12 which may be a ducted spinner, hereinafter described, and discharges it into a series of combution chambers 14, Fig. 6, enclosed within a burner case 16. From the combustion chambers the gas passes through the turbine section 18 of the power plant and is discharged through the thrust nozzle 20. The turbine, shown in detail in Fig. 7, drives the compressor and the accessories and also delivers power through the compressor rotor to the propeller drive shaft 22, Fig. 2, on which the propeller system 23 is mounted.

Figures 2, 3:
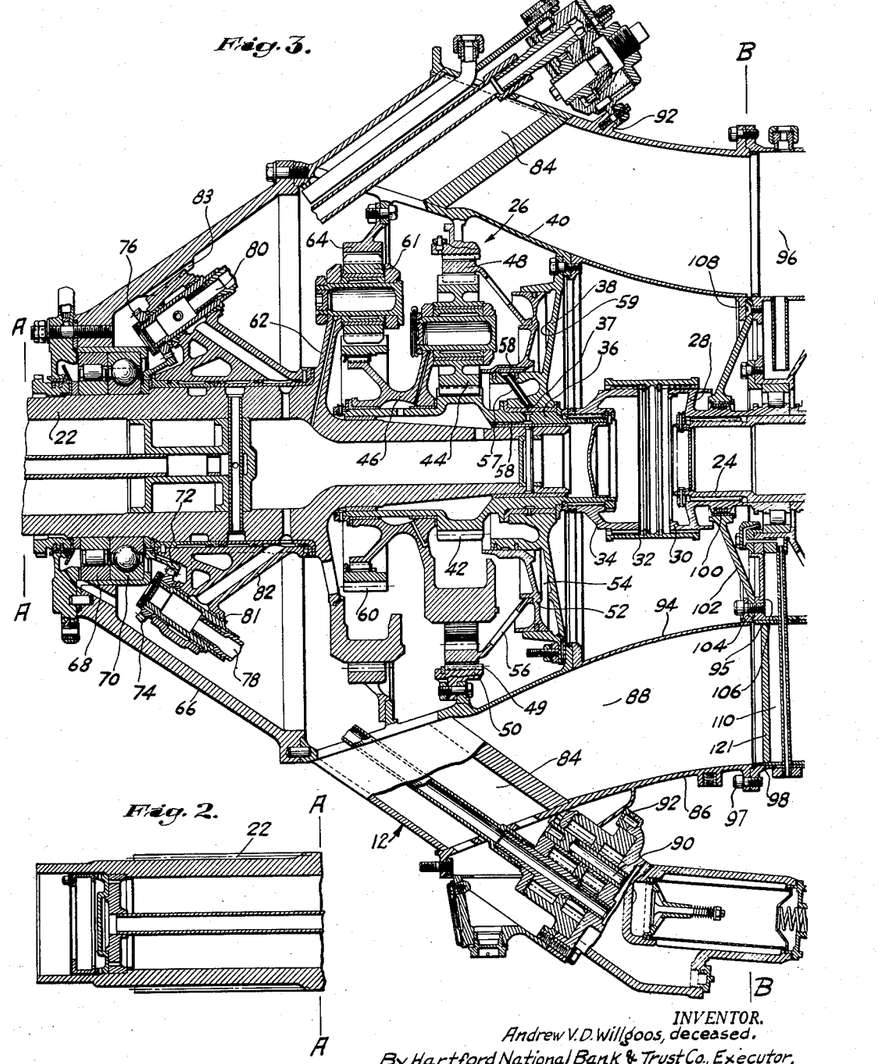
Fig. 2 is a sectional view through a part of the power plant of Fig. 1 from the left hand end to the line A, with the spinner inlet removed.
Fig. 3 is a sectional view of the reduction gear mechanism approximately between the lines A and B of Fig. 1.

It will be understood that the compressor and turbine rotate at speeds substantially in excess of the permissible propeller speeds. With reference to Figs. 2 and 3, the compressor shaft 24, driven by the turbine, is accordingly connected through a reduction gear mechanism 26 to the propeller drive shaft 22. The compressor shaft carries a sleeve 28, Fig. 3, splined thereon and having a projecting cylindrical flange 30 to which a connecting sleeve 32 is loosely splined. The sleeve 32 is also loosely splined to a ring 34 on a sleeve 36 journalled in a bearing 37, carried by a mounting plate 38 located within and forming an end wall of the reduction gear housing 40.

The sleeve 36 has an integral sun gear 42 meshing with one or more planet gears 44 carried by a cage 46 journalled on the outer surface of the sleeve 36, the latter being mounted at its outer or left hand end on the propeller shaft 22. The planet gears 44 mesh with a ring gear 48 which is effectively fixed against rotation within the housing 40. With such an arrangement, the gearing described provides the first stage of speed reduction for the propeller, and causes the cage 46 to rotate at a speed substantially slower than that of the compressor shaft.

The first stage of gear reduction may have associated therewith a torque meter. As shown, the ring gear 48 has its outer surface connected by helical splines 49 to a fixed supporting ring 50 mounted within the reduction gear housing. The ring gear 48 is supported against axial movement by an annular piston 52 fitting within an annular cylinder 54 provided by the plate 38 and connected through a supporting member 56 with the ring gear. Fluid under pressure from a suitable source is admitted to the cylinder 54 through a duct 57 and the pressure existing therein is a measure of the torque developed by the power plant since the torque has a direct relation to the axial thrust exerted on the ring gear by the helical splines when the power plant is in operation. The piston 52 has a passage 58 therein which is adapted to move into alignment with the end of duct 57 as the piston moves to the right to admit additional fluid to the cylinder and prevent excessive movement of the piston. A stop 59 may be provided on the plate 38 to limit the piston movement in the event of a failure of pressure fluid.

For the second speed reduction stage, cage 46 of the first gear reduction has splined thereon a sun gear 60 meshing with a series of planet gears 61 on a cage 62, which in the arrangement shown, is integral with the propeller drive shaft 22. The gears 61 mesh with a ring gear 64 mounted in fixed position within the gear reduction housing 40 thereby providing a speed reduction between the cage 46 and the propeller shaft 22. The two speed reduction devices in series between the sleeve 36 and the cage 62 provide the required reduction in speed between the turbine shaft and the propeller.

The propeller drive shaft 22 is supported at its inner end within the sleeve 36 adjacent to bearing 37 and is additionally supported by a nose housing 66 mounted on the forward end of, and forming a part of, the reduction gear housing. Nose housing 66 normally carries, in addition to the supporting bearing 68, a thrust bearing 70.

A number of accessories may be driven from the propeller drive shaft 22 as by means of a gear 72 mounted on the shaft and engaging with the cooperating gears 74 and 76 on angularly positioned shafts 78 and 80 to the outer ends of which suitable accessories may be connected.

The inner ends of the accessory shafts 78 and 80 are supported in bearings 81 in a bracket 82 surrounding the propeller drive shaft and supported against rotation within the nose housing 66 as by splines 83. The shafts 78 and 80 extend through struts 84 which interconnect reduction gear housing 40 and an outer annular ring or frame element 86. The latter forms a part of the outer wall of the inlet air duct 88 and the outer wall of the housing 40 forms the inner wall of the duct.

Certain of the accessories are mounted at the ends of the shafts 78 and 80. One of the accessories, for example, may be a gear pump 90 which, as is also the case with the other accessories, is mounted on the face of an accessory mounting bracket 92, the latter being mounted on the ring 86 with its face preferably at right angles to the associated shaft 78 or 80. By the arrangement of the shafts at an acute angle to the propeller drive shaft, it is apparent that the accessories need not be located as far from the central line of the power plant as would otherwise be the case. This arrangement accordingly makes possible a reduction in the overall diameter of the power plant.

The reduction gear housing 40 is connected to a ring 94 which forms a continuation of the inner wall of the inlet duct 88 and which extends between the reduction gear housing and the inner wall 95 of the compressor inlet section 96. The outer ring 86 is secured as by bolts 97 to the outer wall 98 of the compressor inlet section. It may be noted, as shown in Fig. 3, that a seal 100 surrounds the sleeve 28 and is supported by a disc 102, the outer edge of which extends between a flange 104 on the ring 94 and a cooperating flange 106 on the compressor inlet section. Bolts 108 hold the disc 102 in place against flange 106 prior to the mounting of the ring 94 and the reduction unit in position.

Figure 4:
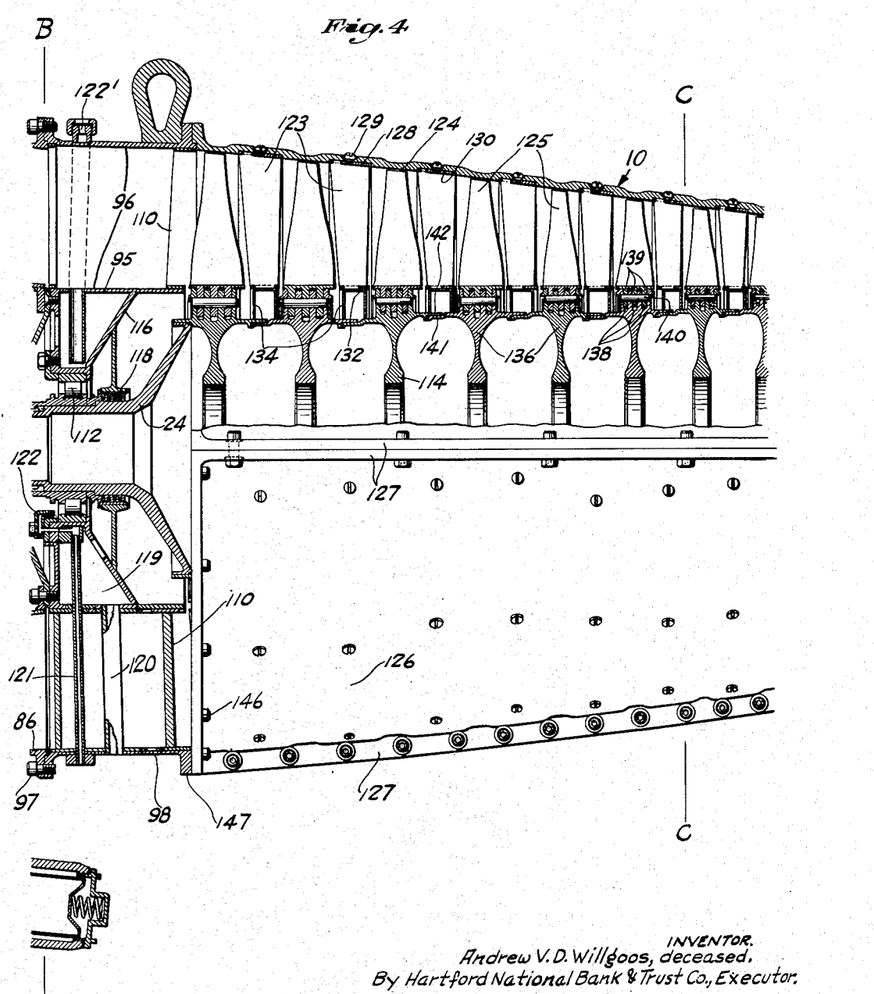
Fig. 4 is a sectional view of the inlet end of the compressor substantially between the lines B and C of Fig. 1.
Figure 5:
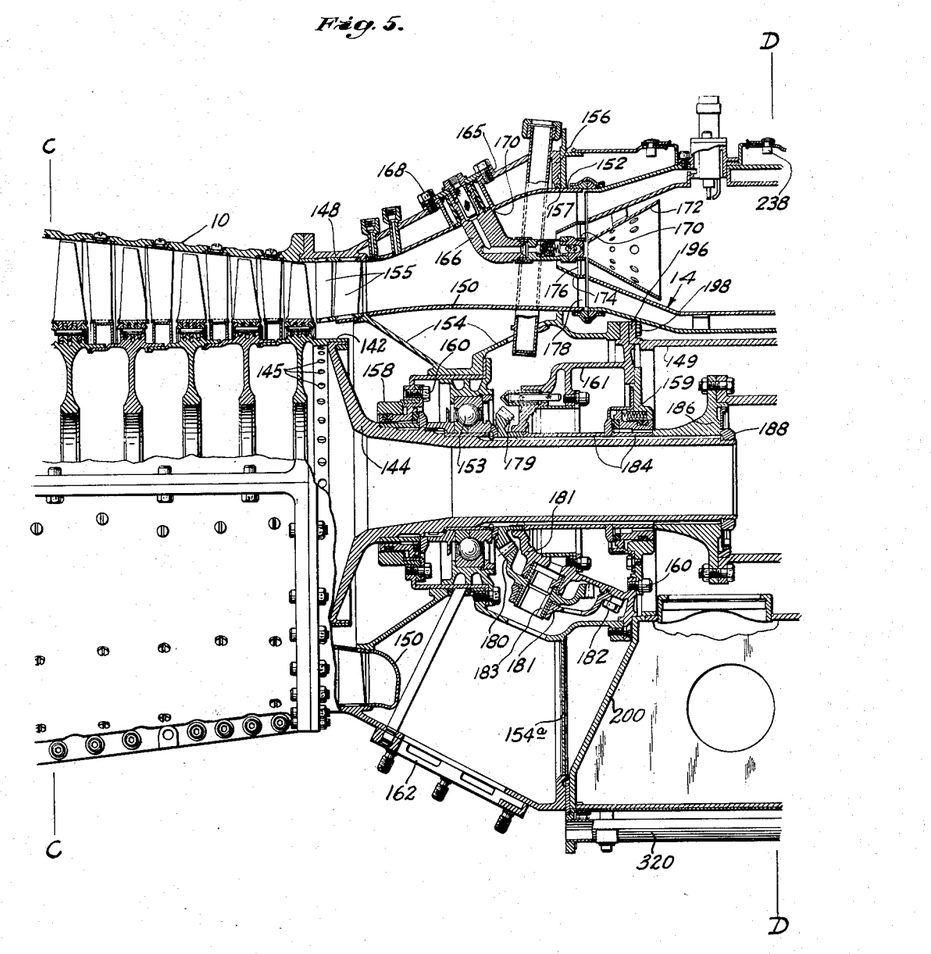
Fig. 5 is a sectional view of the remainder of the compressor and the inlet end of the combustion chambers substantially between the lines C and D of Fig. 1.

Referring now to Figs. 4 and 5, the inner and outer walls 95 and 98 of the compressor inlet section are interconnected and held in spaced relation by substantially radially extending vanes 110 Fig. 4. The compressor inlet section supports a bearing 112 for the inlet end of the compressor rotor 114 by means of a supporting web 116. The web also carries a seal 118 on the downstream side of the bearing 112. The seal 118, in cooperation with the seal 100, encloses the bearing 112 to prevent the escape of lubricant into the air path through the compressor, and forms a sump chamber 119 from which lubricant drains through a duct 120 within one of the vanes 110. The bearing 112 is lubricated through a pipe 121 to a jet 122 which sprays the oil against the bearing. Sump 119 may be vented through another one of the vanes 110 as by a vent opening 122'.

The compressor, which is of the axial flow type, has a plurality of rows of stationary vanes 123 supported by the casing 124 and alternating with rows of blades 125 on the rotor 114. The compressor casing is made up preferably in bolted together segments 126 (four 90° segments in the arrangement shown) so that the individual segments may be removed for access to the compressor without the necessity for a complete teardown of the power plant. The webs 127 on the casing also serve as stiffening flanges, since the casing is a part of the supporting frame of the power plant. The vanes 123 are carried by rings 128, preferably split and secured as by screws 129 in grooves 130 in the casing segments. The inner ends of the vanes are interconnected by rings 132 which carry inwardly projecting sealing flanges 134.

The compressor rotor is built up of individual discs 136, each disc carrying one row of blades. The blades for each disc are mounted on the periphery of the disc which may have a number of circumferentially extending slots 138 to receive similarly shaped fingers 139 on the roots of the blades. A pin 140 may extend axially through the disc and through the fingers 139 to hold the blades in position. With each blade held only by one pin, the tip of the blade is free to move slightly in a circumferential direction with the frictional contact between the fingers and the sides of the slots providing a damping action.

Figures 1, 9, 10, 11, 12:
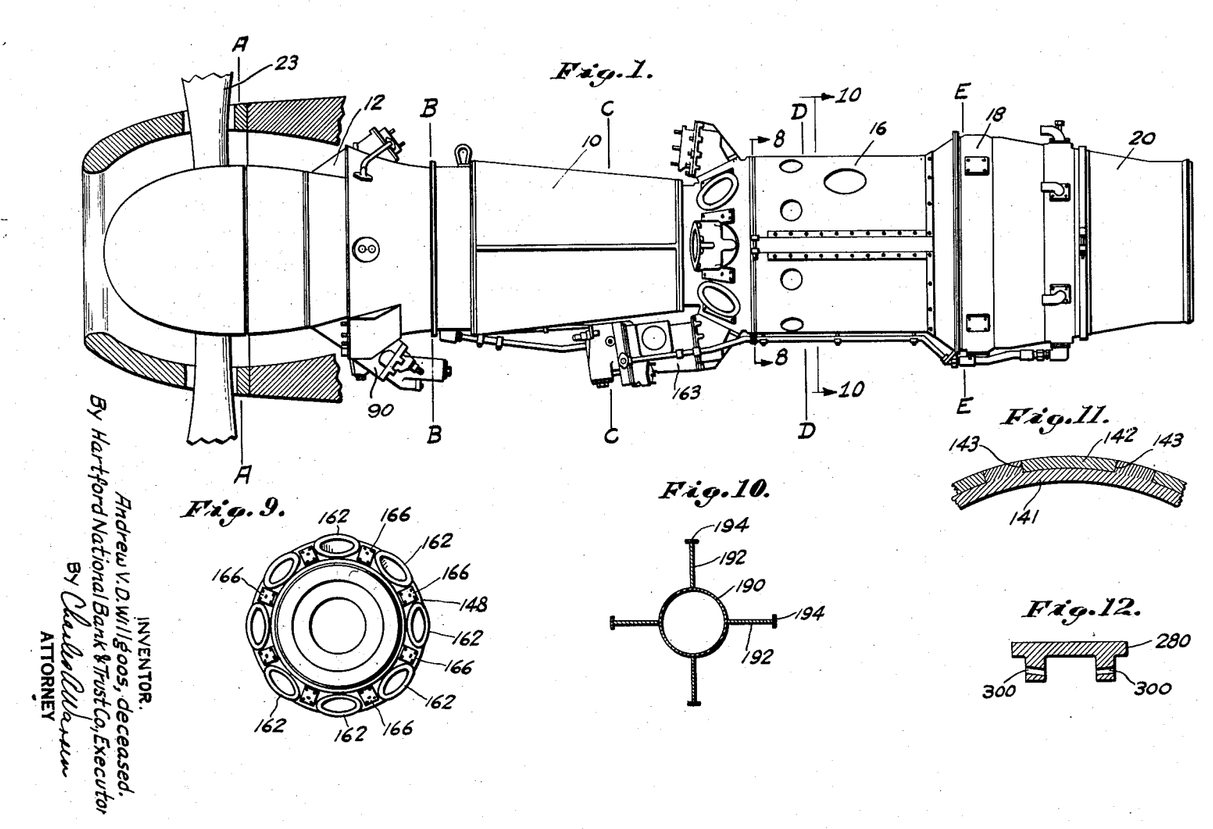
Fig. 1 is a side elevation of the power plant.
Fig. 9 is an end view of the accessory frame section.
Fig. 10 is a sectional view showing the frame construction at the burner section.
Fig. 11 is a fragmentary sectional view of one of the welds for the compressor rotor.
Fig. 12 is a sectional view through the seal ring which extends around the splines on the turbine rotor.

Each compressor disc is provided with oppositely positioned, axially projecting flanges 141 and 142 which interengage to form in effect a drum or cylindrical structure interconnecting and spacing the discs. In the arrangement shown, the upstream flange 141 of each disc has its outer surface corresponding in diameter to the diameter of the inner surface of the downstream flange 142 so that adjoining flanges of adjacent discs, as shown, may be welded or otherwise fastened together in assembly of the rotor. The fastening used may be a plug weld in which the outer flange has spaced holes 143 in which weld material is placed, as shown in Fig. 11. This means of attachment minimizes distortion that might develop from a circumferential weldment.

The shaft 24 at the inlet end of the compressor is bell-shaped with its outer periphery connected to the projecting flange 141 on the first stage disc, as by a similar welding operation. It will be noted that the sealing flanges 134 carried by the rings 132 are closely spaced to the outer surfaces of the cylindrical flanges 141 and 142 on the compressor discs thereby preventing leakage of air around the inner ends of the stator vanes. The downstream end of the rotor 114 has an end bell 144, Fig. 5, similar to the bell-shaped shaft 24. It may be noted that the downstream flange 142 on the last stage disc is wider than the others to receive a series of holes 145 for the admission of cooling air to the inside of the rotor.

The upstream end of the compressor casing is bolted (bolts 146) or otherwise attached to the compressor inlet section 96, the latter having, for example, a mounting flange 147. At its rearward end, the compressor casing is bolted to the accessory frame section 148 which extends between the compressor casing and the burner frame section 149. The accessory frame section 148 supports an air duct member or manifold 150 which directs air from the axially directed discharge annulus of the compressor to the inlet ends of the individual combustion chambers 14 of which there are eight in the arrangement shown. The manifold 150 is, in effect, an annular ring having one side thereof open to the compressor discharge and having a series of standpipes or discharge ducts 152 on the opposite side communicating with the individual combustion chambers.

The accessory frame section also supports a bearing 153 for the end bell 144 at the downstream end of the compressor rotor, the bearing being supported by a ring 154 forming an integral part of the accessory frame section. The ring 154 is supported by struts 154a at its upstream end and also by the manifold 150. At its upper end the ring carries straightening vanes 155 extending across the path of air discharging from the compressor. At its downstream end ring 154 is supported by the inner edge of an annular disc 156 forming a part of the accessory frame section 148 and having spaced openings 157 to receive the discharge ducts 152 on the manifold 150. The ring 154, the disc 156, and the frame section 148 are preferably a composite welded-up assembly of parts, as shown. A seal 158 may be provided at one side of the bearing 153 and another seal 159 on the other side, thus enclosing the bearing to reduce or eliminate leakage of lubricant. These seals may be releasably supported on the ring 154 as by rows of bolts 160, the ring 154 having a downstream projecting end supporting an annulus 161 to which seal 159 is attached.

The frame section 148 has a plurality of angularly spaced mounting pads 162, Fig. 9, with alternate pads supporting suitable accessories such as the pressure and scavenge oil pumps 163 for the lubrication system. The arrangement of these mounting pads is such that intervening pads between the accessories may be used to receive engine mounts, not shown, by which the power plant is supported within an aircraft. Thus, with eight mounting pads, four may support accessories and the other four may support the engine mounts. The mounting and accessory pads are located out of alignment with the combustion chambers.

Between adjacent mounting pads 162, the frame section 148 may have smaller bosses 165, Fig. 5, supporting the fuel nozzles 166, Fig. 5, for the individual combustion chambers. These fuel nozzles are arranged to be removable as a unit from the frame section 148, being held in place as by bolts 168. It may be noted that the fuel nozzle is of such a construction that the discharge end fits within a ring 170 in the duct 152 and is adjacent to a conical ring 172 within the upstream end of the combustion chamber. The ring 170 is supported within a sleeve 174 by radial fins 176 and the sleeve is supported within the duct by other fins 178.

The end bell 144 has mounted thereon, Fig. 5, a gear 179 meshing with a plurality of pinions 180 supported by one or more brackets 181 and by the annulus 161. The brackets are connected to the annulus as by bolts 182. The pinions are mounted with their axes at right angles to the mounting pads 162, and each pinion is in a position to drive, as through a spline 183, the accessories 163. The gear 179 may be supported on the end bell 144 by a spline connection, being held in place by sleeve 184 and a connecting ring 186, all clamped in position by a clamping ring 188 on the end of the bell.

Figure 6:
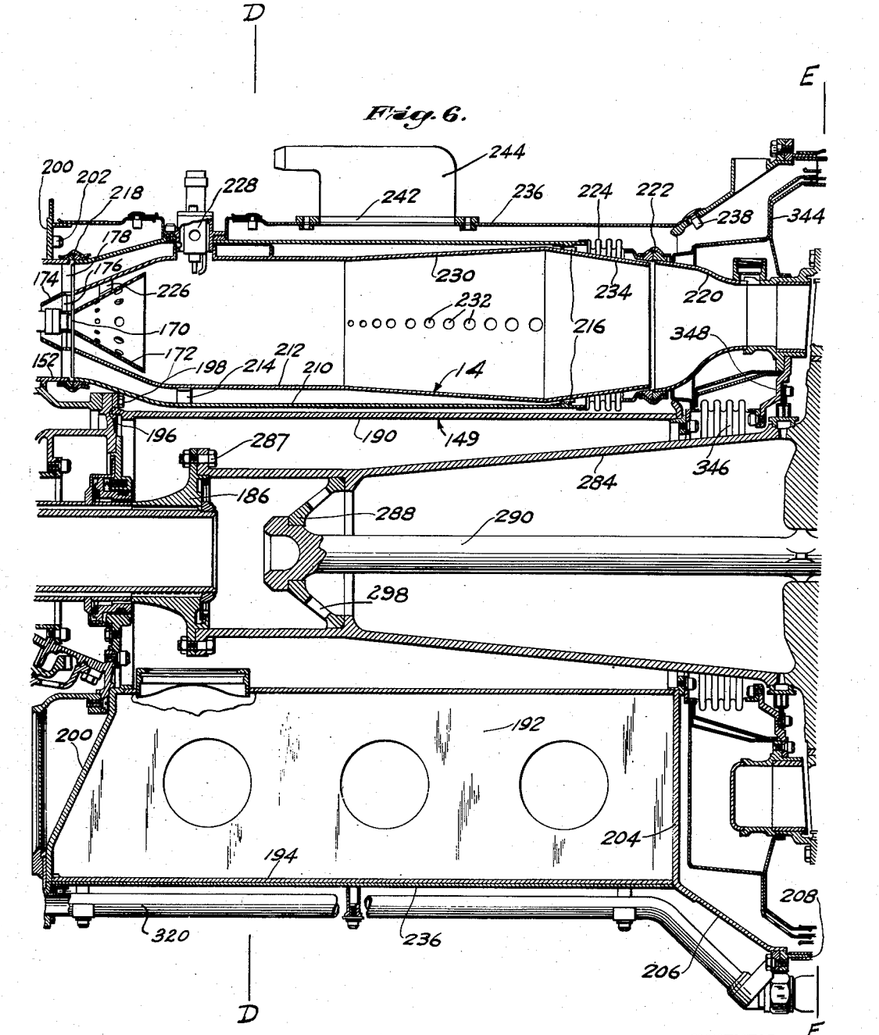
Fig. 6 is a sectional view of the burner construction in which the lines D and E coincide with similar lines in Fig. 1.

In the burner section shown in Fig. 6, the supporting frame consists of a cylinder 190 located within the circle of combustion chambers 14 and having, as shown in Fig. 10, radially extending outwardly projecting radial plates 192 structurally integral with the cylinder. The outer surfaces of the plates have flanges 194 thereon for stiffening. At the upstream end, the cylinder 190 has an integral flange 196 which is secured as by bolts 198 to the accessory frame section. The upstream ends of the plates 192 have reinforcing webs 200 which are attached at their outer ends to the accessory frame section as by bolts 202. At the downstream end of the burner frame section, the plates 192 have secured thereto a disc 204 having its outer edge extending outwardly and rearwardly to form a conical section 206 for attachment to the turbine housing 208, hereinafter described in detail.

The arrangement of the burner section is intended to make possible the attachment of the individual combustion chambers to the unit or their removal therefrom without tearing down the entire power plant. To this end each of the individual combustion chambers is separately and releasably attached to the power plant structure. Each combustion chamber 14 includes an outer shell 210 and an inner shell 212 spaced therefrom as by webs 214 and 216. The inlet end of the outer shell 210 is attached to the discharge duct 152 by a split clamping ring 218 of conventional construction and the downstream end of the outer shell is similarly attached to the turbine inlet manifold 220 as by a split clamping ring 222. A flexible section 224 is inserted in the outer shell to provide for thermal expansion.

The inlet end of the inner shell 212 aligns with the downstream end of the sleeve 174 and supports in alignment therewith the conical ring or flame holder 172 as by webs 226. The arrangement is such that fuel enters the conical flame holder 172 and primary air flows around the fuel nozzle 166 and inside of the sleeve 174 and also between the flame holder 172 and the wall of the inner shield 212. Downstream of a spark plug 228 set into the wall of the combustion chamber, the inner shell 212 has slightly diverging walls 230 which are provided with perforations 232 for the admission of secondary air from the space between the inner and outer shells for the completion of combustion. Beyond the section 230 is a converging section 234, the downstream end of which closely fits the outer shell adjacent to its downstream end. It will be noted that the inner shell is slightly shorter, or, in effect, no longer than the outer shell so that, with removal of the clamping rings 218 and 222, the entire combustion chamber may be removed from the power plant without the necessity for disassembly of the entire power plant. It will be noted, as previously stated, that, in the arrangement shown, there are a plurality of combustion chambers of this type, there being eight combustion chambers in the arrangement shown with two chambers located between adjacent radial webs 192.

Figure 8:
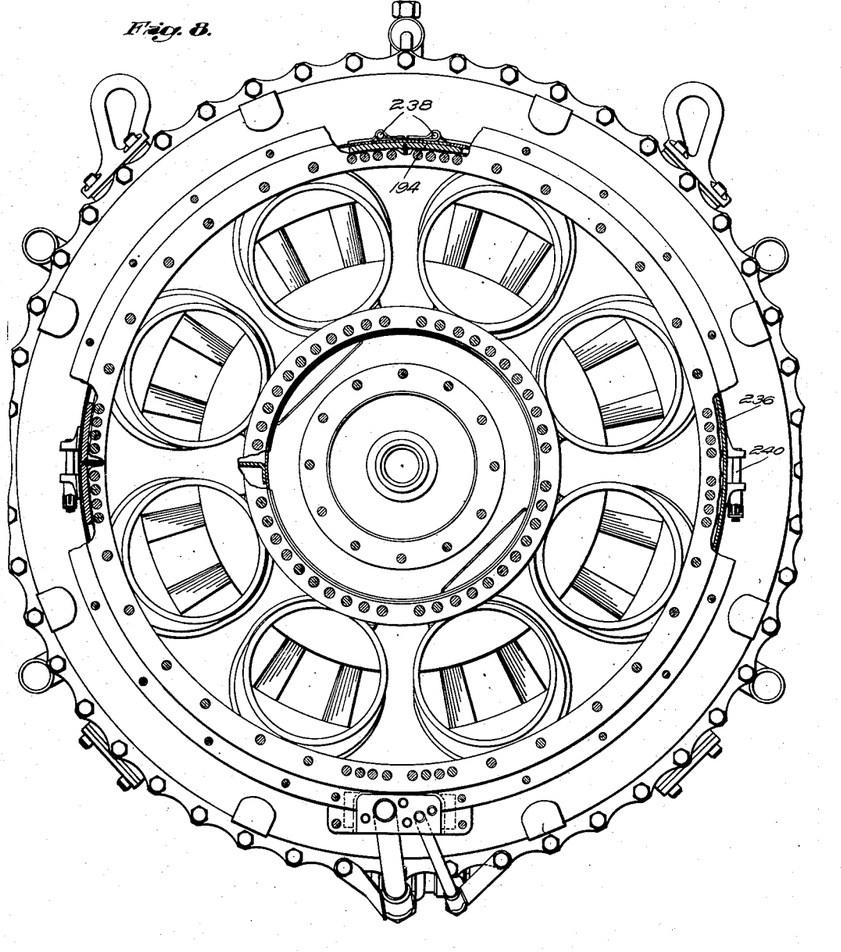
Fig. 8 is a transverse sectional view along line 8—8 of Fig. 1.

The combustion chambers may be enclosed by cover plates 236 which, as shown in Fig. 8, may be connected by removable fasteners 238 to one of the plates 194 with each cover extending for a distance of substantially 90° around the burner section.

The space within the cover plates 236 and surrounding the individual combustion chambers may be pressurized as by ram pressure when the power plant is installed as by connecting one or more openings 242 in one of the plates 236 to a ram air inlet 244, shown in dotted lines in Fig. 6.

Figure 7:
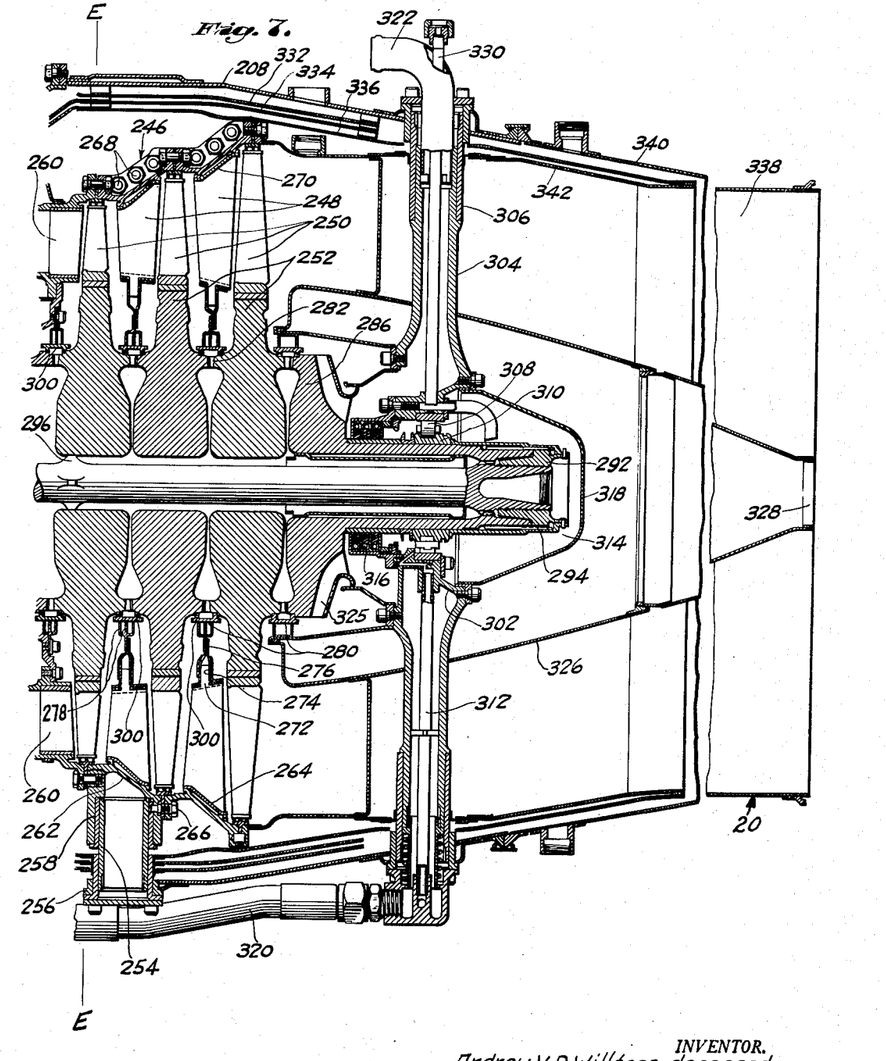
Fig. 7 is a sectional view through the turbine from the line E to the discharge end of the power plant showing the turbine construction.

The turbine which drives the compressor and the propeller includes a turbine casing 246 having spaced rows of vanes 248. Within the casing is the rotor having rows of blades 250 on discs 252 alternating with the rows of vanes. The casing is supported within the turbine housing or frame section 208 by a plurality of radially extending pins 254 positioned in radial openings 256 in the housing and fitting within bosses 258 on the turbine casing. The diameter of the casing at the point where the latter is supported is smaller than the corresponding diameter of the outer housing, to permit radial expansion of the turbine casing. In the arrangement shown, the casing is built up of a turbine inlet nozzle ring 260 and additional nozzle rings 262 and 264, each of which carries one row of the turbine vanes. These rings are bolted together as by the bolts 266 and are preferably split as shown with the valves fastened together as by bolts 268.

Each of the vanes 248 is securely attached at its outer end as by being welded to a ring 270 which is in turn welded to the corresponding casing ring. At the inner end, each turbine vane has a projecting lug 272 which fits in a groove 274 provided in a sealing element 276. The latter has inwardly extending flanges 278 which cooperate with sealing rings 280 mounted on the rotor between adjacent discs.

The turbine rotor may have the blades attached to the discs by any suitable means, the blades, in the arrangement shown, being welded to the discs. Each disc has face splines 282 on opposite ends thereof which, when the discs are assembled, intermesh and align the discs with one another. At opposite ends of the turbine discs are end-bells 284, Fig. 6, and 286, the former extending forwardly within the cylinder 190, Fig. 6, and being secured as by bolts 287 to the connecting ring 186. Within the end-bell 284 is a supporting ring 288 which receives and supports the head of a through bolt 290 which extends through the discs and receives a nut 292 which engages with the opposite end-bell 286 to hold the assembly of discs together. The nut 292 may be locked in place by a splined sleeve 294. It will be noted that the discs are out of contact with the through bolts with the exception of a series of small piloting lugs 296 on the bolt which engage with the first stage disc.

As above stated, cooling air enters the compressor rotor at the discharge end of the compressor. From this point it flows through the compressor end-bell 144 and through openings 298 in the ring 288 to the internal part of the turbine rotor. The face splines 282 are so constructed that air passages exist between the bases of the grooves and the cooperating teeth so that air flows past the splines and through small openings 300, Fig. 12, provided in the sealing sleeve 280 so that air escaping through these passages flows over the surfaces of the rotor discs for cooling them.

The turbine is supported at the discharge end by a bearing support 302 having projecting legs 304 guided within the turbine housing 208 by radial pins 306. Within the bearing mounting 302 is bearing 308 engaging with a ring 310 on the outer surface of the end-bell. Lubricant is supplied to the bearing through a pipe 312 through one of the legs 304 and the bearing is enclosed within a chamber 314 by a seal 316 at one side of the bearing and a cover plate 318 supported on the bearing mounting and enclosing the end of the rotor. Oil collecting within the chamber 314 is scavenged through the same supporting leg 306 that carries the pressurized oil and is pumped out through a connecting duct 320. For the purpose of cooling the bearing, the remaining legs are provided with ram air inlets 322 which direct air into the housing around the bearing for discharge through a centrifugal fan 325 on the end-bell 286 and thence into a conical shield 326 which surrounds the turbine bearing and forms the inner wall of the gas path for the exhaust gas from the turbine. The downstream end of this cone is open as at 328 for the discharge of the cooling air from the bearing. The bearing space 134 may be vented through a standpipe 330 in one of the bearing supporting legs.

The outer turbine housing 208 is shielded from the turbine casing 246 by a series of heat shields 332, 334, and 336. The ram air entering the opening 242 into the space around the combustion chambers flows rearwardly and passes between the housing 208 and the outermost shield 332 and also between the outermost shield 332 and the next adjacent shield 334. The space between the innermost shields is sealed at the upstream end. The shields 332 and 334 terminate a short distance downstream of the last turbine stage but the innermost shield continues downstream to a point within the discharge duct 338 at which point the shield approaches the outer wall 340 of the duct to form a constriction in such a manner that exhaust gas flowing through the duct may cause cooling air to be ejected from the spaces between the shields. A shell 342 secured to the turbine casing 246 forms the outer wall of the passage 338 for the exhaust gas from the turbine and this shell terminates at the same point that the shield 336 terminates.

At the upstream end, the shields 334 and 336 have mounted thereon shield extensions 344, Fig. 6, extending inwardly to surround the turbine inlet nozzle ring and the inlet manifold 220. The latter, as will be apparent, forms an annular chamber connecting with nozzle ring 260, and at its upstream end has spaced inlets connecting with the ends of the combustion chambers. The ram air pressure existing around the burners is sealed from the rotors by a flexible seal 346 extending from the downstream end of the cylinder 190 to the inwardly extending diaphragm 348 on the turbine inlet nozzle.

When the power plant is assembled, the load carrying structure includes the outer wall 86 of the inlet duct 88, which supports the reduction gear, the compressor casing 124, and burner frame section which includes the accessory section 148 and the burner carrying structure 149 made up in part of the cylinder 190 and plates 192, and the turbine housing 208. Thus, the load carrying elements have other functional utility and reduction of power plant weight to a low value is thus possible.

It is to be understood that the invention is not limited to the specific embodiment herein illustrated and described, but may be used in other ways without departure from its spirit as defined by the following claims.

What is claimed is:

1. In a gas turbine power plant, an axial flow compressor including a casing surrounding the annular gas path, said casing having an annular axially directed discharge opening, an axial flow turbine including a casing surrounding the gas path and having inwardly extending vanes thereon, a number of burner ducts arranged in a ring and extending from adjacent the discharge end of the compressor to the inlet end of the turbine, and a transition piece for guiding the air from the annular compressor discharge to the burner ducts, said piece having attaching means for securing the piece to the compressor casing externally of the gas path, in combination with a burner frame structure extending between and connecting the transition piece and the turbine casing and located within the ring of burner ducts, said burner frame structure including a cylindrical element extending between said transition piece and the turbine casing, and attaching means on the transition piece to which the cylindrical element is attached.

2. In a gas turbine power plant, an axial flow compressor including a casing surrounding the annular gas path, said casing having an annular axially directed discharge opening, an axial flow turbine including a casing surrounding the gas path and having inwardly extending vanes thereon, a number of burner ducts arranged in a ring and extending from adjacent the discharge end of the compressor to the inlet end of the turbine, and a transition piece for guiding the air from the annular compressor discharge to the burner ducts, said piece having attaching means for securing the piece to the compressor casing externally of the gas path, in combination with a burner frame structure extending between and connecting the transition piece and the turbine casing and located within the ring of burner ducts, said burner frame structure including a cylindrical element extending between said transition piece and the turbine casing, attaching means on the transition piece to which the cylindrical element is attached, and a plurality of radially extending webs connected along the inner edges to said cylindrical element and projecting outwardly between adjacent burner ducts.

3. In a gas turbine power plant, an axial flow compressor including a casing surrounding the annular gas path, said casing having an annular axially directed discharge opening, an axial flow turbine including a casing surrounding the gas path and having inwardly extending vanes thereon, a number of burner ducts arranged in a ring and extending from adjacent the discharge end of the compressor to the inlet end of the turbine, and a transition piece for guiding the air from the annular compressor discharge to the burner ducts, said piece having attaching means for securing the piece to the compressor casing externally of the gas path, in combination with a burner frame structure extending between and connecting the transition piece and the turbine casing and located within the ring of burner ducts, said burner frame structure including a cylindrical element extending between said transition piece and the turbine casing, attaching means on the transition piece to which the cylindrical element is attached, a plurality of radially extending webs connected along the inner edges to said cylindrical element and projecting outwardly between adjacent burner ducts, and removable cover plates extending externally around the ring of burner ducts and supported by the outer edges of the radially extending webs.

4. In a gas turbine power plant, an axial flow compressor including a casing surrounding the annular gas path, said casing having an annular axially directed discharge opening, an axial flow turbine including a casing surrounding the gas path and having inwardly extending vanes thereon, a number of burner ducts arranged in a ring and extending from adjacent the discharge end of the compressor to the inlet end of the turbine, and a transition piece for guiding the air from the annular compressor discharge to the burner ducts, said piece having attaching means for securing the piece to the compressor casing externally of the gas path, in combination with a burner frame structure extending between and connecting the transition piece and the turbine casing and located within the ring of burner ducts, said burner frame structure including a cylindrical element extending between said transition piece and the turbine casing, attaching means on the transition piece to which the cylindrical element is attached, a plurality of radially extending webs connected along the inner edges to said cylindrical element and projecting outwardly between adjacent burner ducts, removable cover plates extending externally around the ring of burner ducts and supported by the outer edges of the radially extending webs, and a ring extending outwardly from the turbine end of said cylindrical element and connected at its outer portion to the turbine casing externally of the annular gas path, said radially extending webs being attached to said ring.

5. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening.

6. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, other means for releasably securing the accessory case section to the remainder of the burner frame structure internally of the axially directed discharge opening, and a bearing carried by said accessory case section for supporting the rotors.

7. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening, said case section having a plurality of mounting pads externally thereon.

8. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening, said case section having a plurality of mounting pads externally thereon for the attachment of engine accessories and a driving connection from the rotors to said mounting pads for driving the accessories located thereon.

9. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening, said case section having a plurality of mounting pads thereon and also having a series of supporting bosses for supporting fuel nozzles located between the mounting pads, said case section having openings therein communicating with the supporting bosses through which the fuel nozzle may be inserted.

10. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening, said case section having a plurality of mounting pads thereon for the attachment of engine mounting structures and other pads located between said first pads for the attachment of engine accessories, and a driving connection from the rotors to said other pads by which to drive the accessories.

11. An axial flow compressor including a rotor and a surrounding casing defining an annular axially directed discharge opening for the compressor, a turbine including a rotor and a surrounding casing, said rotors being mechanically connected together on a common axis for the turbine rotor to drive the compressor rotor, a combustor construction extending between said compressor and turbine for conducting gas therebetween and in which fuel is mixed with the gas for burning, said combustor construction extending as a ring around the axis of the rotors, a burner frame structure extending between and connecting said casings, said frame structure in the combustor region being located within the ring defined by the combustor construction, said frame structure including a separable accessory case section located at the compressor outlet and forming a gas path from the compressor to the combustor construction and providing a connection between the compressor casing and the remainder of the burner frame structure, means for releasably securing the accessory case section to the compressor casing externally of the axially directed discharge opening, and other means for releasably securing the accessory case section to the remainder of the burner frame structure internally of the axially directed discharge opening, said case section having a plurality of mounting pads thereon for the attachment of engine mounting structures and other pads located between said first pads for the attachment of engine accessories, a driving connection from the rotors to said other pads by which to drive the accessories, a series of fuel nozzles and a series of nozzle supporting bosses also carried by said case section, said case section having openings communicating with said bosses through which the fuel nozzles are inserted.

12. An axial flow compressor including a rotor and a surrounding casing having an axially extending annular inlet at one end and an axially extending annular outlet at the opposite end, a turbine including a rotor and a surrounding casing having an axially extending annular inlet, said compressor outlet and said turbine inlet being directed toward each other and axially spaced apart from each other, said rotors being mechanically connected together on a common axis for the turbine rotor to drive the compressor rotor, a number of burner ducts arranged in a ring between the compressor outlet and the turbine inlet and providing a gas path between said compressor outlet and said turbine inlet, and a burner frame structure extending between and connecting said casings, said burner frame between its ends being located within the ring of burner ducts, said compressor casing and said burner frame structure constituting a part of the supporting structure of the unit, said supporting structure also including a housing connected to and supporting by the turbine end of the burner frame structure, said housing surrounding the turbine casing in spaced relation thereto, and supporting means between said housing and the turbine casing.

13. In a gas-turbine power plant construction, a compressor section including a casing and a rotor, a turbine including a housing, a casing within the housing and a rotor, a shaft extending between and connecting said rotors, a combustion section between the compressor discharge and the turbine inlet including a supporting casing, a burner frame having a sleeve concentric to the shaft and substantially co-extensive axially with the combustion section, said compressor section, said burner frame and said turbine housing being connected together to form the supporting and aligning frame for the elements of the power plant.

14. In a gas-turbine power plant construction, a compressor section including a casing and rotor, a turbine including a housing, a casing within the housing and a rotor, a shaft extending between and connecting said rotors, a combustion section between the compressor discharge and the turbine inlet including a supporting casing, a burner frame having a sleeve concentric to the shaft and substantially co-extensive axially with the combustion section, said compressor section, said burner frame and said turbine housing being connected together to form the supporting and aligning frame for the elements of the power plant, said turbine housing having inwardly extending pins supporting the turbine casing.

15. In a gas turbine power plant construction, a compressor section including a casing and rotor, a turbine including a housing, a casing within the housing and a rotor, a shaft extending between and connecting said rotors, a combustion section between the compressor discharge and the turbine inlet including a supporting casing, a burner frame having a sleeve concentric to the shaft and substantially co-extensive axially with the combustion section, said compressor section, said burner frame and said turbine housing being connected together to form the supporting and aligning frame for the elements of the power plant, said turbine housing having inwardly extending pins supporting the turbine casing and other inwardly extending elements rearwardly of the turbine casing, and a bearing support for the turbine rotor rearwardly of the turbine casing, said other inwardly extending elements engaging with and supporting the bearing support.

16. In a combustion chamber construction for a gas turbine power plant, a burner frame construction in the form of a sleeve and angularly spaced radially outwardly extending webs on said sleeve, a plurality of burner cans located between adjacent webs, a burner inlet element in the form of a ring having a continuous annular opening at the inlet end and a number of angularly spaced discharge openings coinciding with the inlet ends of the burner cans and means for securing the burner cans to the burner inlet element in such a manner as to permit radial removal of the cans.

17. In a combustion chamber construction for a gas turbine power plant, a burner frame construction in the form of a sleeve and angularly spaced radially outwardly extending webs on said sleeve, a plurality of burner cans located between adjacent webs, a burner inlet element in the form of a ring having a continuous annular opening at the inlet end and a number of angularly spaced discharge openings coinciding with the inlet ends of the burner cans and means for securing the burner cans to the burner inlet element in such a manner as to permit radial removal of the cans, and a removable cover plate extending around the burner cans and supported by the outer edges of said webs.

18. An axial flow compressor including a rotor and a surrounding casing having an axially extending annular inlet at one end and an axially extending annular outlet at the opposite end, a turbine including a rotor and a surrounding casing having an axially extending annular inlet, said compressor outlet and said turbine inlet being directed toward each other and axially spaced apart from each other, said rotors being mechanically connected together on a common axis for the turbine rotor to drive the compressor rotor, a number of burner ducts arranged in a ring between the compressor outlet and the turbine inlet and providing a gas path between said compressor outlet and said turbine inlet, and a burner frame structure extending between and connecting said casings, said burner frame between its ends being located within the ring of burner ducts, said compressor casing and said burner frame structure constituting a part of the supporting structure of the unit, said supporting structure also including a housing connected to and supported by the turbine end of the burner frame structure, said housing surrounding the turbine casing in spaced relation thereto, and supporting means between said housing and the turbine casing, said supporting structure also including an accessory case section between the compressor casing and the burner frame structure, said case section having attaching means externally of the compressor outlet for attachment to the compressor casing and having other means internally of the compressor outlet for attachment to the burner frame structure.

19. An axial flow compressor including a rotor and a surrounding casing having an axially extending annular inlet at one end and an axially extending annular outlet at the opposite end, a turbine including a rotor and a surrounding casing having an axially extending annular inlet, said compressor outlet and said turbine inlet being directed toward each other and axially spaced apart from each other, said rotors being mechanically connected together on a common axis for the turbine rotor to drive the compressor rotor, a number of burner ducts arranged in a ring between the compressor outlet and the turbine inlet and providing a gas path between said compressor outlet and said turbine inlet, and a burner frame structure extending between and connecting said casings, said burner frame between its ends being located within the ring of burner ducts, said compressor casing and said burner frame structure constituting a part of the supporting structure of the unit, said supporting structure also including a housing connected to and supported by the turbine end of the burner frame structure, said housing surrounding the turbine casing in spaced relation thereto, and supporting means between said housing and the turbine casing, said supporting structure also including a ring located between the burner frame structure and the turbine housing, said ring having attaching means at its inner edge for attachment to the burner frame structure and other means at its outer edge externally of the turbine inlet for attachment to the turbine housing.

20. An axial flow compressor including a rotor and a surrounding casing having an axially extending annular inlet at one end and an axially extending annular outlet at the opposite end, a turbine including a rotor and a surrounding casing having an axially extending annular inlet, said compressor outlet and said turbine inlet being directed toward each other and axially spaced apart from each other, said rotors being mechanically connected together on a common axis for the turbine rotor to drive the compressor rotor, a number of burner ducts arranged in a ring between the compressor outlet and the turbine inlet and providing a gas path between said compressor outlet and said turbine inlet, and a burner frame structure extending between and connecting said casings, said burner frame between its ends being located within the ring of burner ducts, said compressor casing and said burner frame structure constituting a part of the supporting structure of the unit, said supporting structure also including a housing connected to and supported by the turbine end of the burner frame structure, said housing surrounding the turbine casing in spaced relation thereto, and supporting means between said housing and the turbine casing, said supporting structure also including a ring located between the burner frame structure and the turbine housing, said ring having attaching means at its inner edge for attachment to the burner frame structure and other means as its outer edge externally of the turbine inlet for attachment to the turbine housing, and radially extending webs located between adjacent burner ducts and attached along their inner edge to the burner frame structure and at their turbine ends to said ring.

References Cited in the file of this patent

UNITED STATES PATENTS

| | | |
|---|---|---|
| 1,907,454 | Squires | May 9, 1933 |
| 2,397,998 | Goddard | Apr. 9, 1946 |
| 2,401,941 | Lee | June 11, 1946 |
| 2,432,359 | Streid | Dec. 9, 1947 |
| 2,445,114 | Halford | July 13, 1948 |
| 2,454,738 | Hawthorne | Nov. 23, 1948 |
| 2,469,439 | Lundquist | May 10, 1949 |
| 2,493,641 | Putz | Jan. 3, 1950 |
| 2,514,513 | Price | July 11, 1950 |
| 2,547,619 | Buckland | Apr. 3, 1951 |
| 2,548,886 | Howard | Apr. 17, 1951 |
| 2,556,161 | Bailey et al. | June 12, 1951 |
| 2,564,218 | Walker et al. | Aug. 14, 1951 |
| 2,575,264 | Feilden | Nov. 13, 1951 |
| 2,576,762 | Lawter | Nov. 27, 1951 |
| 2,581,999 | Blatz | Jan. 8, 1952 |

FOREIGN PATENTS

| | | |
|---|---|---|
| 935,401 | France | Feb. 2, 1948 |
| 936,276 | France | Feb. 16, 1948 |

OTHER REFERENCES

"Flight," March 18, 1948, pages a to h.